United States Patent [19]

Moser

[11] Patent Number: 4,638,670

[45] Date of Patent: Jan. 27, 1987

[54] APPARATUS FOR THE DETERMINATION OF THE DISTANCE TRAVELED BY A PISTON IN A CYLINDER

[75] Inventor: Bernd Moser, Hamm/Sieg, Fed. Rep. of Germany

[73] Assignee: Boge GmbH, Eitorf, Fed. Rep. of Germany

[21] Appl. No.: 766,871

[22] Filed: Aug. 16, 1985

Related U.S. Application Data

[63] Continuation-in-part of Ser. No. 653,930, Sep. 24, 1984, Pat. No. 4,587,850, which is a continuation-in-part of Ser. No. 621,075, Jun. 15, 1984, Pat. No. 4,577,509.

[30] Foreign Application Priority Data

Aug. 16, 1984 [DE] Fed. Rep. of Germany ....... 3430045

[51] Int. Cl.$^4$ ............................................. G01R 27/26
[52] U.S. Cl. .................................. 73/658; 324/61 R; 324/59; 324/71.1; 324/207
[58] Field of Search .......................... 73/658, 11, 118; 324/61 R, 59, 71.1, 207

[56] References Cited

U.S. PATENT DOCUMENTS

| | | | |
|---|---|---|---|
| 2,978,638 | 4/1961 | Wing et al. | 324/70 |
| 3,805,150 | 4/1974 | Abbe | 324/61 R |
| 3,833,094 | 9/1974 | Grossman | 73/11 |
| 4,107,975 | 8/1978 | Gargile | 73/11 |
| 4,206,401 | 6/1980 | Meyer | 324/61 R |
| 4,577,509 | 3/1986 | Moser | 73/658 |
| 4,587,850 | 5/1986 | Moser | 73/658 |

FOREIGN PATENT DOCUMENTS

| | | |
|---|---|---|
| 1248959 | 8/1967 | Fed. Rep. of Germany. |
| 1299432 | 7/1969 | Fed. Rep. of Germany. |
| 1933640 | 1/1970 | Fed. Rep. of Germany. |
| 3212433 | 4/1983 | Fed. Rep. of Germany. |
| 3244891 | 6/1984 | Fed. Rep. of Germany. |
| 136069 | 6/1979 | German Democratic Rep. . |
| 2106651 | 4/1983 | United Kingdom . |

*Primary Examiner*—Anthony V. Ciarlante
*Attorney, Agent, or Firm*—Nils H. Ljungman

[57] ABSTRACT

Apparatus for the determination of the location and/or distance traveled by a piston in a cylinder. This apparatus can easily be integrated into shock absorbers, vibration dampers and pneumatic springs, and exhibits a high degree of insensitivity to at least electrical interference, therefore being particularly well-suited for operation under unfavorable ambient conditions. As a result of the use of the most modern semiconductor technology and a suitable geometric arrangement, a very good resolution can be achieved, along with an automatic recognition of the direction of piston travel. Such an apparatus has a number of semiconductor elements; in one embodiment, in a beam fastened inside the cylinder or, in another embodiment, in the hollow piston rod. These semiconductor elements are arranged so that, over the axial length of the piston stroke, the distances between two neighboring semiconductor elements correspond to a specified measurement value resolution. The semiconductor elements are connected with an electronic calculating or computing system, and the component opposite the semiconductor elements is an electrode which generates an electric field. This electrode is connected in operation to a source of electrical voltage or a ground.

20 Claims, 16 Drawing Figures

APPARATUS FOR THE DETERMINATION OF THE DISTANCE TRAVELED BY A PISTON IN A CYLINDER

CROSS REFERENCE TO RELATED APPLICATIONS

This application is a continuation-in-part of co-pending application Ser. No. 653,930, filed by Bernd Moser on Sept. 24, 1984 now U.S. Pat. No. 4,587,850, entitled "Arrangement For Determining The Travel Of A Piston" which application is a continuation-in-part of co-pending application Ser. No. 621,075, filed by Bernd Moser on June 15, 1984 now U.S. Pat. No. 4,577,509, also entitled "Arrangement For Determining The Travel Of A Piston", both applications assigned to the same assignee as the instant application.

BACKGROUND OF THE INVENTION

1. Field of the Invention:

The invention relates to an apparatus for the determination of the distance traveled by a piston in a cylinder, especially for hydraulic, pneumatic or hydropneumatic equipment such as vibration absorbers, pneumatic springs and hydropneumatic springs, whereby the piston can be moved axially by means of a piston rod in a cylinder filled with at least one damping medium.

2. Description of the Prior Art:

Measurement devices of a general type are known, which comprise capacitors and electronic means as shown in Democratic Republic of Germany Pat. Publication No. DD-PS No. 136 069. These devices are used quite generally for measurement of lengths, whereby in this design, the advantages of a simple capacitive system are combined with the measurement technology advantages of the differential capacitive system. For this purpose, on one hand, a measurement capacitor, whose capacity is changed linearly by the displacement to be measured, is connected to a reference alternating voltage, and on the other hand, a reference capacitor with the same dielectric is connected to an alternating current voltage of the same frequency and opposite phase. The amplitudes of the measurement alternating current voltage may thereby be carried by electronic means so that the alternating current voltage induced in an electrode common to both capacitors becomes zero. Such a measurement apparatus is excessively complicated and is hardly practical for use in hydraulic, pneumatic or hydropneumatic equipment.

Measurement devices are also known for the measurement of a layer thickness such as in British Pat. Specification No. 2 106 651, on which the different layer thicknesses deposited on the piston are measured, so that by means of this process the position of the piston can be determined. Devices of this type cannot be used by themselves in hydraulic, pneumatic or hydropneumatic equipment, such as vehicle suspension systems.

Measurement devices based on ultrasound are also known, where the determination of the distance traveled is made by means of sound propagation and the corresponding computing unit. These systems do not lend themselves to miniaturization, and are sensitive to temperature fluctuations and mechanical interference. In addition, they are technically very complicated and, therefore, very costly.

The known measurement devices based on the induction principle have approximately the same disadvantages as the abovementioned ultrasonic sensors. Measurement devices based on capacitance are mechanically sturdy and can also be manufactured cost-effectively, but they are susceptible to external interference and temperature fluctuations.

OBJECT OF THE INVENTION

The object of the invention, therefore, is the development of a measurement system which can be easily integrated in a piston cylinder unit, which exhibits a high degree of insensitivity to interference, for example, electromagnetic interference, temperature, etc., and which is therefore particularly wellsuited for operation under unfavorable conditions. In addition, the measurement system should be capable of being manufactured cost-effectively.

SUMMARY OF THE INVENTION

This objective is achieved by the invention, in that there are a number of semiconductor elements in a beam fastened inside the cylinder or in the hollow piston rod, that over the axial length of the piston stroke the distances between two neighboring semiconductor elements corresponds to the required measurement resolution, whereby the semiconductor elements are connected with an electronic computing system and that the component opposite the semiconductor elements is designed as an electrode and can be moved telescopically, whereby the electrode is connected with an electrical potential or ground.

An advantage of this configuration is that, as a result of the use of digital technology with its known advantages, it is insensitive to electromagnetic interference and unfavorable operating conditions. It is therefore particularly well-suited for applications such as in mechanical engineering or in automobile technology. Another advantage is that, as a result of the high signal-to-noise ratio of the electrical signal, it is possible to achieve a sturdy and secure apparatus for this type of application for the determination of distance traveled.

In addition, it is easily possible to process the measurement signals directly in a digital electronic system, that is, the analog/digital converters, for example, are no longer necessary. A computation or control could be done by a microprocessor, for example.

In an especially favorable embodiment, the semiconductor elements and the electronic computing system are integrated in the beam. From a fabrication point of view, it is possible to manufacture a separate component which, when used in an appropriate assembly, contains all the necessary elements of the measurement and computing apparatus.

According to another important embodiment, the semiconductor elements are located in the beam and the electronic computing system is located in the base of the cylinder. When such a divided configuration is used, the modular concept can be used to design and manufacture the equipment for different applications.

One preferred embodiment calls for the semiconductor elements to be designed using complementary MOS technology, whereby, as is known, the lower power consumption should be noted as an important characteristic. The semiconductor elements can also be designed using P-channel or N-channel technology.

In addition, the electronic computing system can also be located outside the piston-cylinder unit.

BRIEF DESCRIPTION OF THE DRAWINGS

Preferred embodiments of the invention are diagrammatically and schematically illustrated in the accompanying drawings, wherein.

DESCRIPTION OF THE PREFERRED EMBODIMENTS

Figure 1:
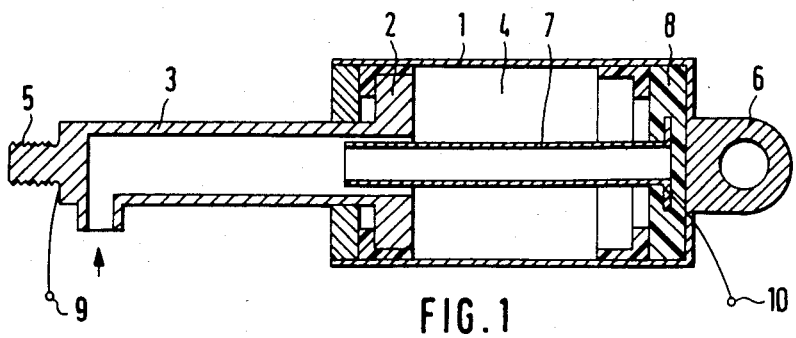
FIG. 1 shows a sectional view of a vibration damper, in which the hollow piston rod forms a variable capacitor in conjunction with a tube in a cavity of the damper.

The vibration damper illustrated in FIG. 1 comprises substantially a cylinder 1, a piston 2 and a piston rod 3, well known in the prior art. In the interior cavity 4 of the cylinder 1 there is at least one damping medium serving for damping vibrations of the piston 2. Attachment means 5 and 6, well-known in the prior art, are provided for mounting the vibration damper in a vehicle. The piston rod 3, which is made hollow, slides telescopically over a tube 7, the tube 7 being located in the cylinder 1, and attached thereto by an insulating body 8 which insulates the tube 7 from the remainder of the components of the damper. The hollow piston rod 3 and the tube 7 form together a variable circular cylindrical capacitor. The damping medium present in the interior cavity 4 forms a dielectric for the capacitor.

The hollow piston rod 3 forms the first electrode and is connected through a lead 9 connected through an insulating terminal (not shown) to appropriate terminals of an appropriate measurement device. The tube rod 7 forms a second electrode which is connected through a lead 10 to appropriate terminals of the measurement device.

Figure 2:
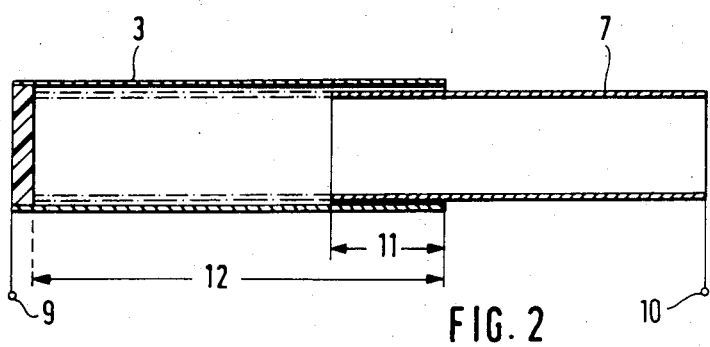
FIG. 2 shows a sectional view of a diagrammatic representation of a cylindrical capacitor.
Figure 8:
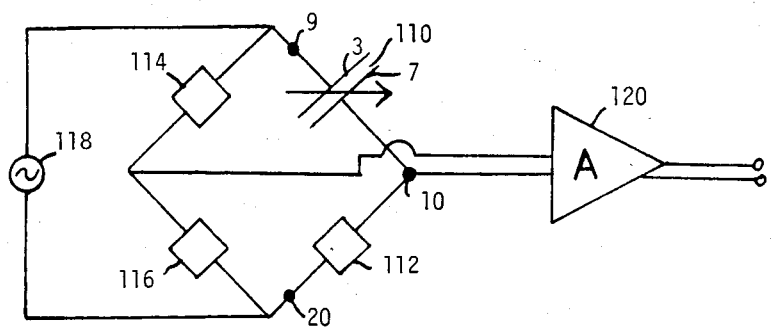
FIG. 8 shows schematically the embodiments of FIG. 1 and FIG. 7 arranged in an impedance measuring bridge.

The steepness of the change in capacitance is dependent upon the spacing between the outer surface of the tube 7 and the inner surface of the hollow piston rod 3, and on the medium present between them. The hollow piston rod 3 is arranged coaxially with and is concentrically spaced from the tube 7; a space between them receives the dielectric which may be a damping medium such as oil, or even a dielectric solid between the facing surfaces of the tube 7 and the piston rod 3. In FIG. 2, there is diagrammatically illustrated a cylindrical capacitor, the first electrode thereof comprising the hollow piston rod 3 and the second electrode comprising tube 7. The spacing 11 indicates a practical minimum overlap. The spacing 12 indicates the maximum overlap between the two surfaces when the piston 2 is as far to the right in FIG. 1 as it can move. These overlaps produce a minimum and maximum capacitance when appropriately converted, and represent the minimum and maximum travel positions of the piston. By interpolating between these extremes, the position of the piston in the cylinder is indicated by a capacitance thereinbetween. The leads 9 and 10 serve, for example, for connection to a capacitance measuring bridge as shown in FIG. 8 infra.

Figure 3:
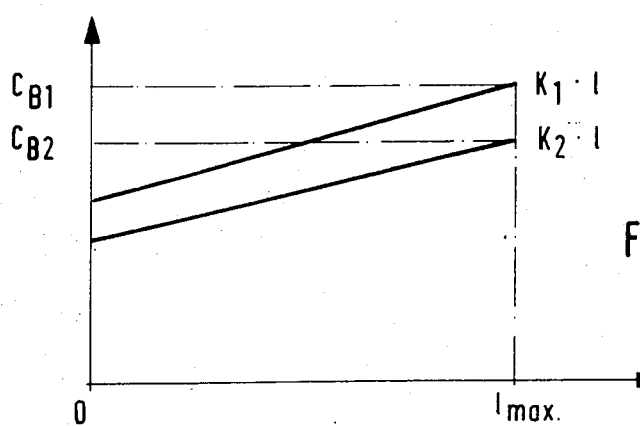
FIG. 3 shows a diagram of capacitance of the cylindrical capacitor of FIG. 2 with respect to piston position or piston travel.

FIG. 3 shows a diagram in which the capacitance of such a cylindrical capacitor is plotted against piston position or travel. It is seen from FIG. 3 that the change in capacitance is proportional to the travel of the piston, and the steepness of the curve is dependent on the ratio of the inside radius of the bore in the piston rod to the outside radius of the tube 7 as well as the relative dielectric constant $E_r$. The relative dielectric constant $E_r$ is predetermined in any known embodiment by the characteristics of the damping medium used. The two solid straight lines show two different cylindrical capacitor arrangements having, for example, different maximum overlapspacings between the piston rod 3 and the tube, or relative dielectric constants $E_r$ of the dielectric.

Figure 4:
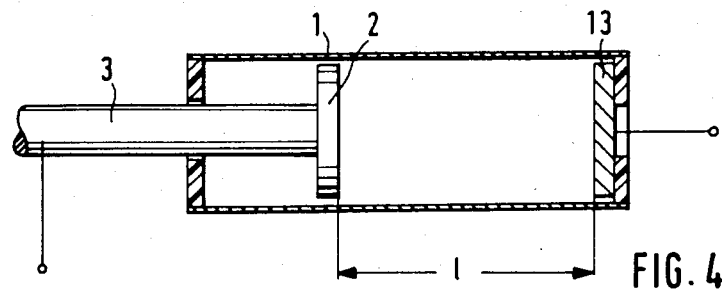
FIG. 4 shows a sectional view of a further embodiment of a vibration damper, in which the face of the piston and the base of the cylinder form plates of a capacitor.

FIG. 4 shows diagrammatically an alternative, second capacitive embodiment of the invention illustrating a vibration damper again having a cylinder 1, a piston 2 and a piston rod 3. The piston 2 and the base 13 of the cylinder respectively form the first and second electrodes of a capacitor. The base 13 of the cylinder 1 is mounted in this cylinder 1 but insulated therefrom so that a desired change in capacitance can be obtained by varying the distance between the piston 2 and the base 13 of the cylinder 1. By appropriate conversion of the measured value, likewise in this embodiment, the position of the piston can be obtained.

Figure 5:
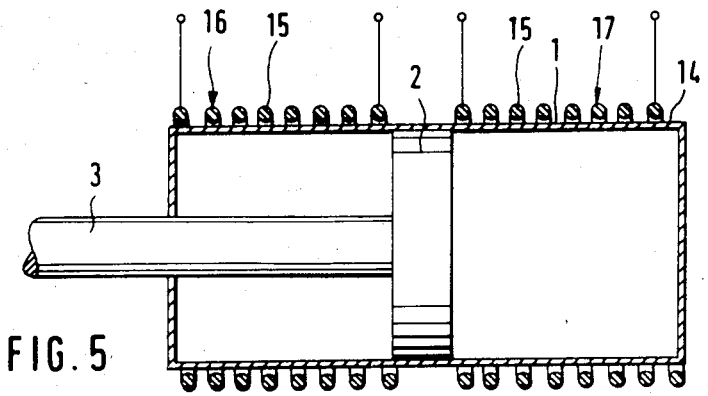
FIG. 5 shows a sectional view of a cylindrical vibration damper wherein an inductive coil is disposed on the surface of the cylinder.

As an alternative inductive embodiment, there is shown in section in FIG. 5, a vibration damper wherein again the principal components are the cylinder 1, the piston 2 and the piston rod 3.

The outer surface 14 of the vibration damper cylinder 1 is provided with windings 15, comprising a first coil 16 and a second coil 17, for respective generation of a magnetic field. The coils 16 and 17 when connected appropriately as the arms of a half-bridge generate a positional signal indicative of the position of the piston 2.

The resultant inductive half-bridge generates a bridge voltage determined by the degree or position of the insertion of the piston 2 in the damper cylinder, so that, a suitable signal corresponding to the piston travel is produced.

Figure 6:
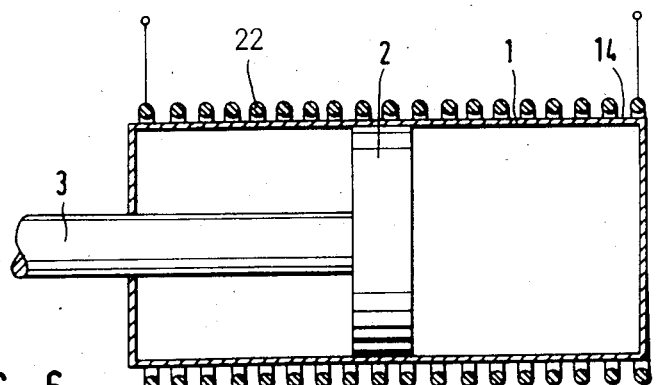
FIG. 6 shows a sectional view of a vibration damper with another coil arrangement.

FIG. 6 shows a modified inductive embodiment. The principal components of a vibration damper are here again the cylinder 1, the piston 2 and the piston rod 3. This piston rod 3 does not have to be made hollow in the embodiments using inductance. A winding is disposed on the outer surface of the vibration damper cylinder 1 extending preferably over at least the entire range of travel of the piston. On insertion of the piston within this region, there is a resulting change in inductance which can be correspondingly evaluated. The piston rod 3, at least, in FIG. 5 and FIG. 6, is preferably made of a ferromagnetic material in order to vary the inductance as much as possible from one relative position of the piston 2 and piston rod 3 to another position thereof.

Figure 7:
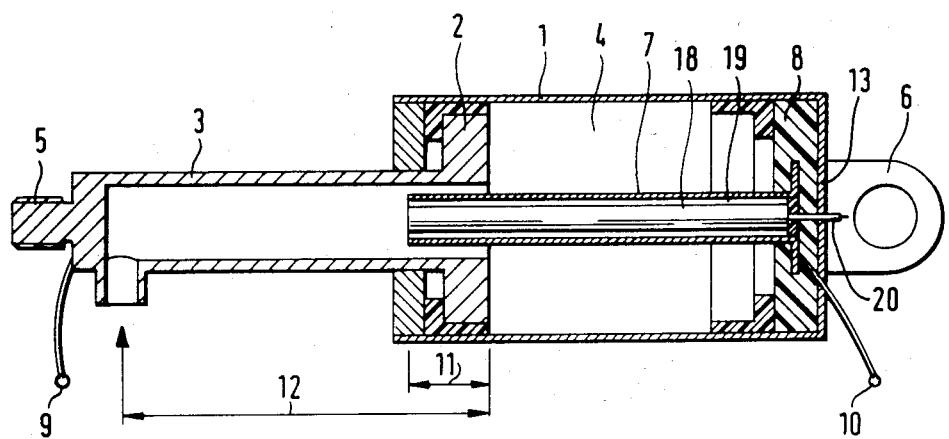
FIG. 7 shows a sectional view of a vibration damper in which the tube forms, with a further cylindrical tube, a second fixed capacitor.

The vibration damper illustrated in FIG. 7 comprises a fourth capacitance embodiment of the invention which is made up of basically the cylinder 1, the piston 2 and the piston rod 3 as in FIG. 1. Within the interior cavity 4 of the cylinder 1, there is the damping medium serving for damping vibrations. As in the embodiment of FIG. 1, mounting means 5 and 6 are provided for mounting the damper in the vehicle in a manner well-known in the prior art. The piston rod 3, which is made hollow, can slide telescopically over the tube 7, the tube 7 being secured in the cylinder in an insulating body 8 and being insulated with respect to the remainder of the components of the damper. The hollow piston rod 3 and the tube 1 form together the cylindrical capacitor. The damping medium present in the interior cavity 4 preferably forms the dielectric for the capacitor. as in FIG. 1. The hollow piston rod 3 forms the first electrode and the tube 7 forms the second fixed electrode and is connected through the lead 10, passing through an insulated terminal arrangement (not shown) to the input of an appropriate measurement device such as shown in FIG. 8 infra.

The steepness of the change in capacitance is dependent upon the spacing between the outer surface of the tube 7 and the inner surface of the hollow piston rod 3 and on the dielectric medium present between them. The hollow piston rod 3 is arranged to be coaxial with and spaced from the tube 7; the space between them receives a suitable dielectric.

The spacing 11 represents the minimum overlap and the spacing 12 the maximum overlap between the two surfaces, producing accordingly a minimum and a maximum capacitance, which, appropriately converted, indicate the momentary piston travel, i.e., the position of the piston in the cylinder.

Secured within the cylindrical interior 19 of the tube 7 is a further tube 18 which is likewise arranged spaced from the tube 7. Between the two tubes, the damping fluid here again acts preferably as a dielectric as in FIG. 1; the dielectric may be solid. By the fixed arrangement of the two tubes 7 and 18 with respect to one another, there is produced a capacitor having a fixed capacitance at a particular temperature and pressure. The cylindrical tube 18 which acts as the further electrode is mounted in the insulating body 8 of the cylinder again in an insulating manner and is connected to the measurement receiver through a lead 20. The tube 7 and the tube 18 again form a tubular circular capacitor which serves for compensation of the measurement signal deviation caused by the pressure and temperature influence between the tube 7 and the piston rod 3. The manner of operation of the overall system is well-known in the prior art of Wheatstone Bridge as a capacitive half-bridge.

In FIG. 8, a schematic diagram is shown representing a bridge circuit 108, e.g., an impedance Wheatstone Bridge, for sensing the changes in capacitance of a variable capacitor 110 formed by the tube 7 and the hollow piston rod 3. The leads 9 and 10 are connected in the bridge 108 so that the capacitor 110 forms half on one arm of the bridge 108. Either a fixed capacitor external to the vibration damper or a temperature variable capacitor, as shown in FIG. 7, and formed by the tube 7 and the tube 18, comprises a capacitor 112 forming one-half of the bridge 108 connected to the capacitor 110. Two other impedance elements, 114 and 116, form the other half of the bridge 108. Series capacitors 110 and 112 form one arm and the series impedances 114 and 116 form the other arm of the bridge 108. A generator 118, preferably supplying alternating current, is connected across the bridge 108 at the connectors between the capacitors 110 and 114 and the impedances 112 and 116. The operation of a Wheatstone Bridge is well-known in the electrical prior art.

It is within the purview of the invention that this generator 118 may also be a generator of direct voltage if the impedance levels of the bridge 108 are appropriate therefor. Alternatively, within the purview of the invention, a pulse generator may also be used under special circumstances. The terminal 10 forms one input of an amplifier 120; a junction of the impedances 114 and 116 forms the other input of the amplifier 120 which generates a signal proportional to the position of the piston 2.

Figure 9:
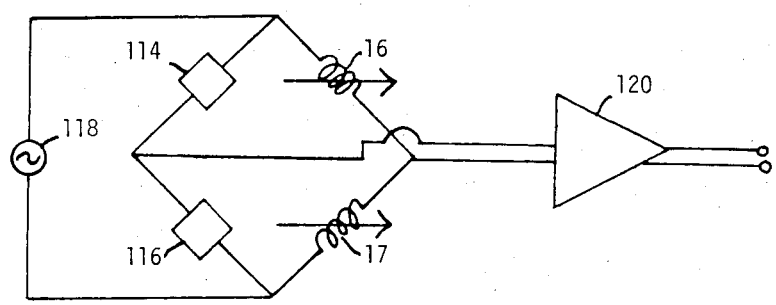
FIG. 9 shows schematically the inductive coil arrangement of FIG. 5 connected into an impedance measuring bridge.

In the case of the inductive coil embodiment of the invention as shown in FIG. 5 being adapted to the circuit in FIG. 8, the first coil 16 replaces the capacitor 110 and the second coil 17 replaces the capacitor 112 as in shown in FIG. 9. The other capacitors 114 and 116 are preferably replaced by impedances.

However, other impedance elements may be used for capacitors 114 and 116 if their impedance is chosen appropriately in a manner which is well known in the impedance bridge art.

For example, if the capacitive impedances 110 and 112 in FIG. 8 both increase by the same percentage amount due to change in the mutual dielectric because of temperature, pressure, etc., the voltage at the terminal 10 will remain constant, as is well-known in the art of electrical bridge measurements such as the Wheatstone Bridge.

Figure 10:
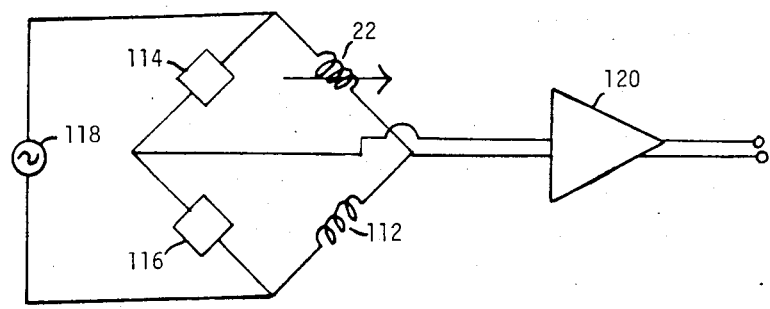
FIG. 10 shows schematically the coil arrangement of FIG. 6 connected into an impedance measuring bridge.

FIG. 10 shows the coil arrangement 22 of FIG. 6 connected into the bridge 108 replacing the capacitor 110.

Figure 11:
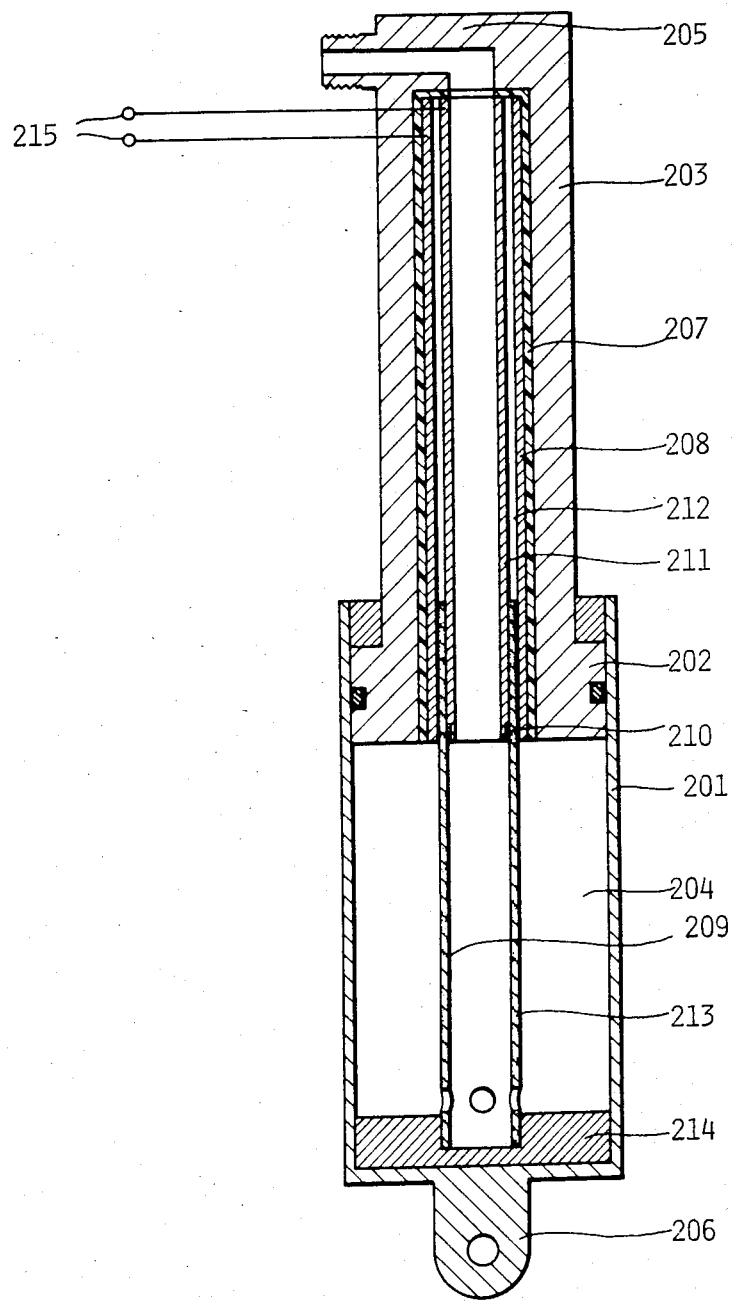
FIG. 11 shows a sectional view of another embodiment of which a tubular capacitor is arranged in the interior of the piston rod.

The vibration damper illustrated in FIG. 11 generally comprises the cylinder 201, the piston 202 and the piston rod 203. In the interior cavity 204 of the cylinder 201, there is provided a damping medium serving for damping the vibrations. Attachment means 205 and 206 are provided for mounting the vibration damper on the vehicle.

The piston rod 203 is made hollow, and therewithin are disposed a first electrode 208 and the second electrode 211. The first electrode 208 is insulated from the piston rod 203 by an insulating layer 207. Between the first electrode 208 and the second electrode 211 is a gap 212.

Since the first electrode 208 is substantially concentric to and spaced away from the second electrode 211, the tubular body 213, which is secured to the base 214 of the cylinder 201, can enter the gap 212 axially during operation of the damper in the vehicle. By the entry of the tubular body 213, a variation occurs in the capacitance between the first electrode 208 and the second electrode 211.

In the specific embodiment of FIG. 11, a ceramic tube is provided as the tubular body 213. The variation in capacitance arises because of different dielectric characteristics of the ceramic tube and the rest of the medium which may be oil.

The ceramic tube and the mineral oil which is present as the damping fluid each have a different dielectric constant, and on insertion of the ceramic tube 213 in the gap 212, the immersed surface of the ceramic tube acts as a different dielectric from oil.

In order to eliminate as far as possible the effect of the oil in the gap, between the electrode 211 and the ceramic tube 213, the ceramic tube 213 is provided with an electrically conducting surface on its inner cylindrical surface 209. This conducting surface is electrically connected to the second electrode 211 by an electrically conducting ring 210 provided on the outer surface of the second electrode 211. Since the inner cylindrical surface 209 electrically becomes a part of the second electrode 211, the oil in the gap between the second electrode 211 and the ceramic tube 213 does not have any electric field generated therein. Therefore, this gap does not produce any capacitive effect and thereby variations in this gap due to tolerances, wear of the parts, etc., do not deleteriously affect the performance accuracy.

By virtue of the arrangement of the electrodes 208 and 211 either in the hollow piston rod 203 or in the cylinder 201, structurally preferred possibilities are provided for making the connections for the leads 215. The leads could be made to terminate as connecting terminals on the outer surface either of the cylinder 201 or the piston rod 203. The electrodes 208 and 211 are held fixed relative to one another. The tubular body 213 is fixed also; however, the tubular body is mounted in the cylinder 201 so that during operation of the vibration damper, a telescopic displacement of the components within each other takes place, and the tubular capacitor can perform as desired.

Figure 12:
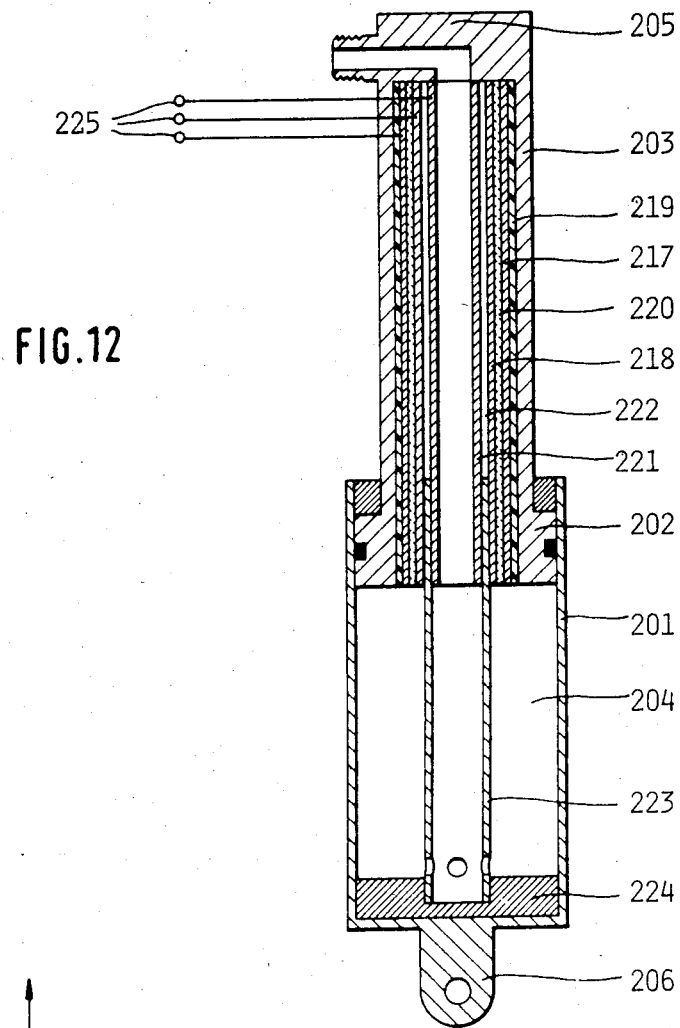
FIG. 12 shows a sectional view of a vibration damper in which a second fixed capacitor is mounted in the interior of the piston rod.

The vibration damper illustrated in FIG. 12 comprises substantially the cylinder 201, the piston 202 and the piston rod 203. In the interior cavity 204 of the cylinder 201, there is the damping medium serving for damping the oscillations. Securing devices 205 and 206 are provided as attachment means for mounting the damper in the vehicle.

Provided in the piston rod 203, which is made hollow, are the first electrode 217 and the second electrode 218. The first electrode 217 is insulated with respect to the piston rod 203 by a tube 219 of, for example, synthetic resin. A dielectric 220 is disposed between the first electrode 217 and the second electrode 218.

Spaced away from the second electrode 218 is a third electrode 221. The tubular body 223 is disposed to be able to enter the intermediate space 222 between the second electrode 218 and the third electrode 221 during active functioning of the damper in the vehicle. By the insertion of the tubular body 223 into the space 222, there occurs a change of capacitance between the second electrode 218 and the third electrode 221. The first electrode 217 forms, together with the second electrode 218, a fixed capacitance by contrast. The space 222 may be filled with a dielectric fluid, e.g., mineral oil.

Preferably, as illustrated, the tubular body is metallic; with the use of an electrically conducting tubular body 223, the latter must be earthed through the insulating body 224 of the cylinder. This results in the following manner of operation: with the piston rod 203 extended, the three electrodes form two fixed capacitances of known magnitude. On inward movement of the grounded electrically conducting tubular body 223, the capacitance between the second electrode 218 and the third electrode 221 is reduced because the effective capacitive surface area is diminished.

As an alternative in regard to the material of the tubular body 223, it is also possible for the tubular body 223 to be made in the form of an electrically non-conducting tube. For example, a tube of synthetic resin is suitable for this purpose. If a synthetic resin tube is provided to form the tubular body 223 then on entry of the synthetic resin tube between the second electrode 218 and the third electrode 221, there is produced a parallel circuit of two capacitors. The two capacitances of different values arise by the different dielectrics so that the overall capacitance of the second electrode 218 and the third electrode 221 results from the addition of the two individual capacitances. These different values of capacitance arise partly since the synthetic resin tube and the mineral oil which may be present as the damping fluid, each have different dielectric constants. If the tubular body 223 is made of synthetic resin, on insertion of the synthetic resin tube, the inserted surface area of the tubular body 223 acts as a dielectric.

The variable capacitance follows the formula:

$$C_{ges}(l) = C_a + C_b$$

where:
$C_{ges}$ = overall capacitance
$C_a$ = the individual capacitance of the first medium (e.g. Mineral oil)
$C_b$ = the individual capacitance of the second medium (e.g. Synthetic resin)

Figure 13:
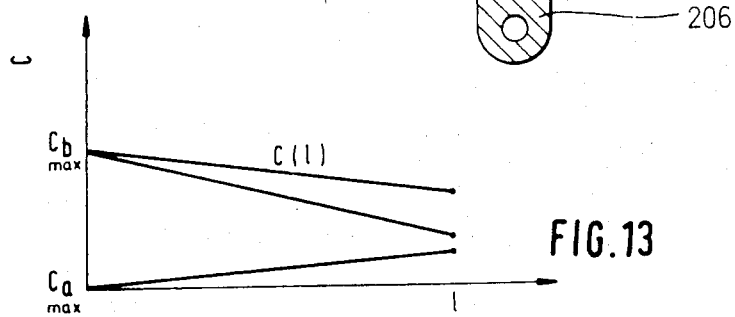
FIG. 13 depicts a piston travel/capacitance diagram for a cylindrical capacitor.

In FIG. 13, a diagram is shown in which the capacitance for such a cylindrical capacitor is drawn against piston travel or displacement. The individual capacitance $C_a$ falls steadily on insertion of the piston 202, whereas the individual capacitance $C_b$, in which the tubular body 223 is used as the dielectric, steadily increases. The two individual capacitances add up and form the resultant characteristic line $C_{ges}$.

By the disposition of the electrodes 217, 218 and 221, either within the hollow piston rod 203 or in the cylinder 201, there are advantageous possibilities for making connections to the leads 225 since these only need to be mounted as connecting pins on the outside surface of either the cylinder 201 or the piston rod 203. The electrodes are advantageously kept fixed relative to one another, and the tubular body 223 is likewise fixed, but in the other component. Accordingly during the action of a vibration damper, a telescopic displacement of the parts within one another takes place, so that the desired measured variable capacitance is formed.

Figure 14:
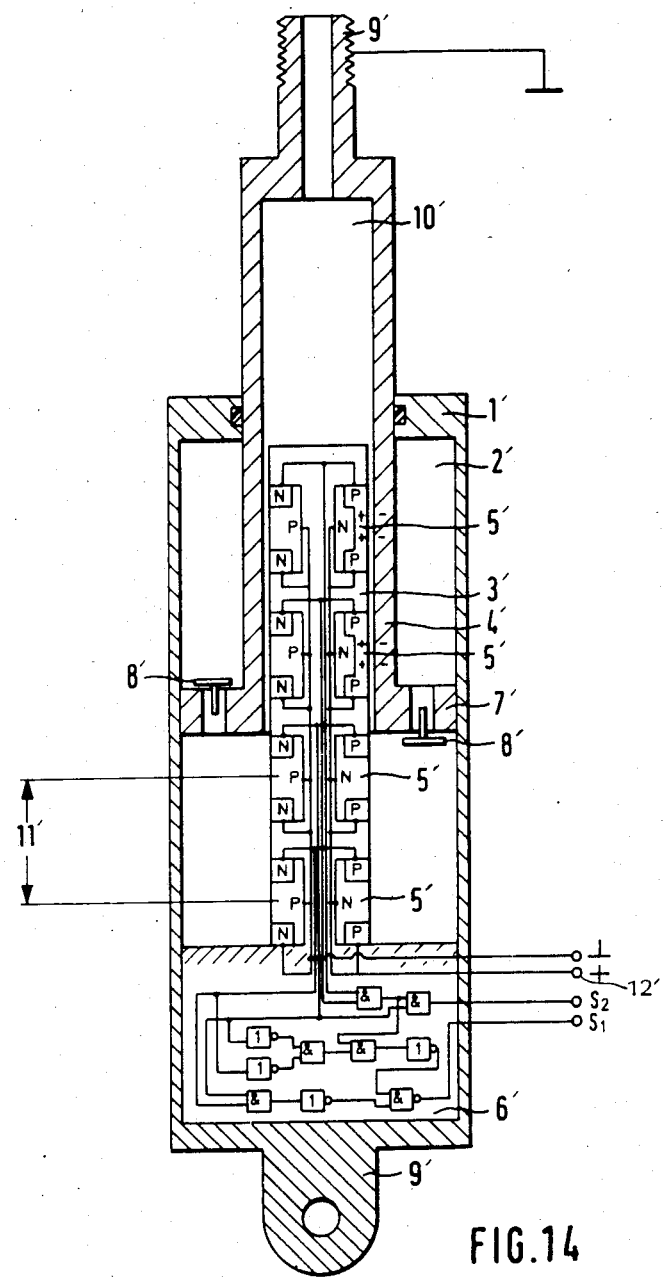
FIG. 14 shows, in cross section, a piston-cylinder unit, in the form of a vibration absorber, having semiconductor elements therein.

The equipment illustrated in FIG. 14 comprises essentially a cylinder 1', an interior portion 2' of which a piston rod 4' guides an axially-movable piston 7'. Such a vibration absorber is filled in the interior portion 2' of the cylinder 1' with at least one damping medium. The piston 7' thereby serves as a vibration absorber, whereby there are valves 8' which perform a throttling function. To fasten the assembly between a wheel mount and the body, there are fastening devices 9'.

The piston rod 4' is provided with a cavity 10' into which a beam 3' is inserted. The beam 3' permits a free axial movement of the piston 7' in the cylinder 1'. The beam 3' is equipped with semiconductor elements 5', which are preferably located in the beam 3' at uniform intervals over a range of, or the entire axial stroke length of, the piston 7'. The distance 11' between and the density of the individual semiconductor elements 5' is determined by the specified measurement value resolution required for a desired application. Depending on whether these semiconductor elements 5' are closer to or farther from one another, when these semiconductor elements 5' are covered by the piston rod 4', a signal corresponding to the resolution of the semiconductor elements 5' and the location of the piston 7' is sent to the electronic calculating or computing circuitry or system 6'. For this purpose, in this embodiment, the piston rod 4' is designed as an electrode, and either has an electrical voltage source connected thereto, or is connected to ground. An electrical voltage source 12' is chosen having such a voltage that an electric field is set up between the semiconductor elements 5' and the piston rod 4' with its connected piston 7', which is sufficiently large to form a gate channel, such as that of a field effect transistor in the semiconductor elements 5' immediately adjacent to the piston rod 4' with its connected piston 7' thereby actuating these adjacent semiconductor elements 5' by either turning them on or off, depending upon whether the semiconductor elements 5' are designed and manufactured to operate in their enhancement mode or their depletion mode.

The operational characteristics of the equipment are preferably chosen so the fact that the semiconductor elements 5', which are covered by the hollow piston rod 4', have a conductive channel, which is either P-conducting or N-conducting, depending on the design of the semiconductor elements 5' and on the relative potential on the piston rod 4' with respect to the semiconductor elements 5'. In FIG. 14, the piston rod 4' is connected to ground, and the semiconductor elements 5' are therefore chosen to be P-conducting and are connected to the power supply 12', which is positive. This conductivity state means that there is a "high" signal at the inputs of the digital computing elements.

The inputs of the digital computing elements from the semiconductor elements 5', which are not covered by the hollow piston rod 4', are in the "low" state. By connecting the digital computing elements according to a determined solution algorithm, a two-place digital distance signal is produced, which reflects the following four states and, therefore, the corresponding positions of the piston 7'.

| $S_1$ | $S_2$ | Distance (mm) |
| --- | --- | --- |
| 0 | 0 | 0–40 |
| 0 | 1 | 40–80 |
| 1 | 0 | 80–120 |
| 1 | 1 | 120–160 |

This table describes one example.

The semiconductor elements 5' are connected to an electronic calculating circuit 14'. One example of such a circuit is shown in FIG. 14, which has AND circuits and inverter circuits interconnected as shown.

Figure 15:
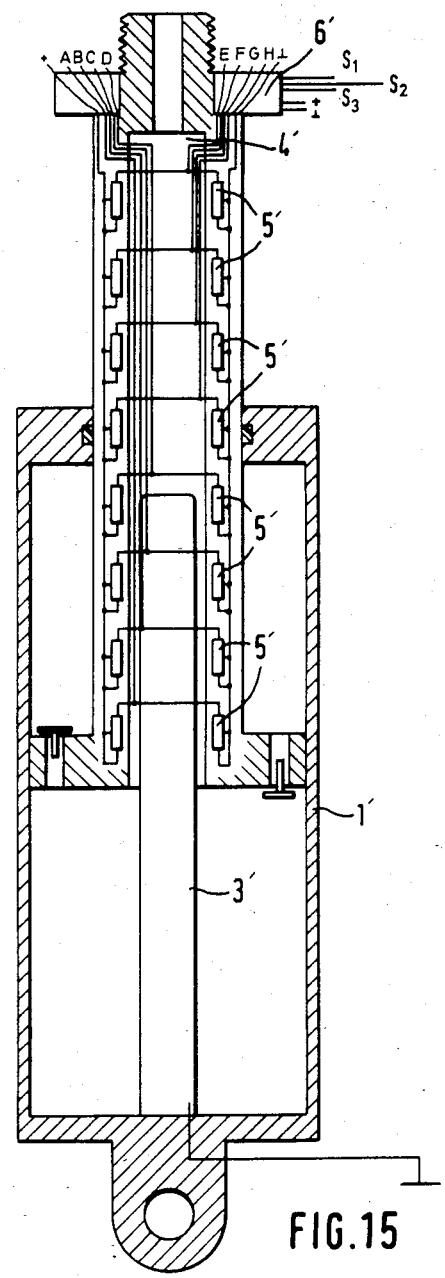
FIG. 15 shows another embodiment of the piston-cylinder component illustrated in FIG. 14, with the distinction that the semiconductor elements are an integral part of the piston rod.

FIG. 15 shows a vibration absorber, basically like the one illustrated in FIG. 14, in which the beam 3' is designed as an electrode, with either an electrical voltage or a ground potential connected thereto. The semiconductor elements 5' are arranged on the inside surface of the hollow piston rod 4' and insulated therefrom and one another in such a way that when there is a telescopic displacement of the piston rod 4' in relation to the cylinder 1', a corresponding overlap is achieved between the semiconductor elements 5' and the beam 3', so that, again, a corresponding measurement signal is sent to an electronic calculating or computing circuit or system 6'. The semiconductor elements 5' are interconnected by a series of conductors A through H, which in turn are connected to the electronic calculating system 6'. The electronic calculating system 6' is preferably connected in an analogous fashion to the electronic circuit of FIG. 14. Electronic circuits of this type are very well known in the art and are used, among other applications, in digital watches, etc. Otherwise, this embodiment corresponds in terms of its function as a vibration absorber to the embodiment already illustrated in FIG. 14.

Figure 16:
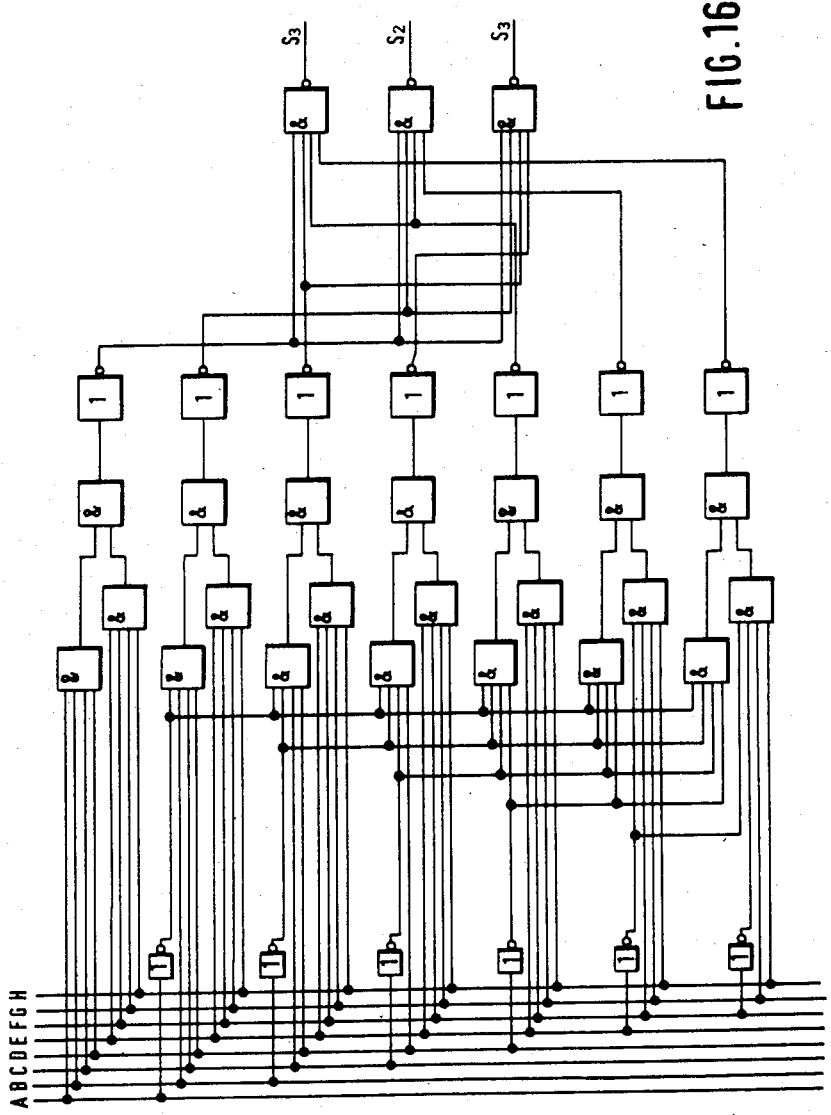
FIG. 16 shows a circuit diagram of an electronic computing system.

FIG. 16 shows a circuit diagram of an electronic calculating system, like that identified as 6' in FIG. 15. The states which are assumed by the semiconductor components as a function of the piston travel are transmitted via the connections A to H. The 3-place digital word $S_1$ to $S_3$ represents the digital distance signal, which can be directly processed in a digital electronic computing system.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for a cylinder assembly, said apparatus being for determining location of piston means in a cylinder means of said cylinder assembly, said piston means having a predetermined range of movement, said apparatus comprising:

semiconductor means including a plurality of semiconductor elements, said plurality of semiconductor elements being sensitive to predetermined electric fields and having a predetermined range of displacement substantially related to said movement range of said piston means;

electric field generating means for generating said predetermined electric fields to which said plurality of semiconductor elements are sensitive, said electric field generating means having means for connection to a first source of predetermined electrical potential, whereby at least one portion of said cylinder assembly is maintained in operation at a predetermined electrical potential, said predetermined electrical potential being determined by said said first source of predetermined electrical potential;

said semiconductor means having means for connection to a second source of predetermined electrical potential, said second source of predetermined electrical potential having a different electrical potential than said first source of predetermined electrical potential; and said semiconductor means being disposed with respect to said cylinder assembly such that said predetermined electrical potential of said at least one portion of said cylinder assembly generates said predetermined electric field and actuates, in operation, at least one of said plurality of semiconductor elements in said predetermined range of movement of said piston means with said cylinder means, whereby said location of said piston means within said cylinder means is determined.

2. The apparatus according to claim 1 wherein said piston means comprises a piston and a hollow piston rod and said cylinder means has a rod stationarily disposed with respect to said cylinder means;

said stationary rod being disposed to fit telescopically within said hollow piston rod; and said stationary rod being connected to said means for connection to said first source of predetermined electrical potential, whereby electrical potential of said stationary rod activates said at least one of said plurality of semiconductor elements.

3. The apparatus according to claim 2 including an electronic calculating circuit connected to said semiconductor means whereby signals from said semiconductor means are decoded to generate signals indicating location of said piston means in said cylinder means.

4. The apparatus according to claim 4 wherein said calculating circuit is disposed in said cylinder assembly.

5. The apparatus according to claim 4 wherein said cylinder assembly has a base portion and said calculating circuitry is disposed in said base portion of said cylinder assembly.

6. The apparatus according to claim 4 wherein said calculating circuitry is disposed outside said cylinder assembly.

7. The apparatus according to claim 3 wherein said semiconductor means is disposed stationary with respect to said stationary rod.

8. The apparatus according to claim 3 wherein said semiconductor means are disposed to be movable with said hollow piston rod.

9. The apparatus according to claim 2 wherein said semiconductor means is disposed stationary with respect to said stationary rod.

10. The apparatus according to claim 9 wherein said semiconductor means are disposed within said stationary rod.

11. The apparatus according to claim 2 wherein said semiconductor means are disposed to be movable with said hollow piston rod.

12. The apparatus according to claim 2 wherein said plurality of semiconductor elements comprise pairs of complementary N-channel and P-channel devices.

13. The apparatus according to claim 1 including an electronic calculating circuit connected to said semiconductor means whereby signals from said semiconductor means are decoded to generate signals indicating location of said piston means in said cylinder means.

14. The apparatus according to claim 13 wherein said calculating circuit is disposed in said cylinder assembly.

15. The apparatus according to claim 14 wherein said cylinder assembly has a base portion and said calculating circuitry is disposed in said base portion.

16. The apparatus according to claim 13 wherein said calculating circuitry is disposed outside said cylinder assembly.

17. The apparatus according to claim 1 wherein said cylinder assembly includes at least one damping medium disposed within said cylinder assembly.

18. The apparatus according to Claim 1 wherein said plurality of semiconductor elements are P-channel devices.

19. The apparatus according to claim 1 wherein said plurality of semiconductor elements N-channel devices.

20. The apparatus according to claim 1 wherein said plurality of semiconductor elements comprise pairs of complementary N-channel and P-channel devices.

* * * * *